United States Patent [19]

Lindsay et al.

[11] Patent Number: 5,675,154
[45] Date of Patent: Oct. 7, 1997

[54] SCANNING PROBE MICROSCOPE

[75] Inventors: Stuart M. Lindsay; Tianwei Jing, both of Tempe, Ariz.

[73] Assignee: Molecular Imaging Corporation, Phoenix, Ariz.

[21] Appl. No.: 653,200

[22] Filed: May 24, 1996

Related U.S. Application Data

[63] Continuation-in-part of Ser. No. 388,068, Feb. 10, 1995.
[51] Int. Cl.[6] .................................................. H01J 37/20
[52] U.S. Cl. .............................. 250/442.11; 250/440.11; 250/306
[58] Field of Search ................... 250/442.11, 440.11, 250/306, 307; 73/105

[56] References Cited

U.S. PATENT DOCUMENTS

| | | | |
|---|---|---|---|
| Re. 33,387 | 10/1990 | Binnig | 250/306 |
| Re. 34,331 | 8/1993 | Elings et al. | 250/306 |
| Re. 34,489 | 12/1993 | Hansma et al. | 250/560 |
| 4,343,993 | 8/1982 | Binnig et al. | 250/306 |
| 4,785,177 | 11/1988 | Besocke | 250/442.1 |
| 4,800,274 | 1/1989 | Hansma et al. | 250/306 |
| 4,806,755 | 2/1989 | Duerig et al. | 250/306 |
| 4,866,271 | 9/1989 | Ono et al. | 250/306 |
| 4,868,396 | 9/1989 | Lindsay | 250/440.1 |
| 4,871,938 | 10/1989 | Elings et al. | 310/328 |
| 4,877,957 | 10/1989 | Okada et al. | 250/306 |
| 4,914,293 | 4/1990 | Hayashi et al. | 250/306 |
| 4,935,634 | 6/1990 | Hansma et al. | 250/560 |
| 4,947,042 | 8/1990 | Nishioka et al. | 250/306 |
| 4,969,978 | 11/1990 | Tomita et al. | 204/153.1 |
| 4,992,728 | 2/1991 | McCord et al. | 324/158 |
| 5,025,658 | 6/1991 | Elings et al. | 73/105 |
| 5,103,095 | 4/1992 | Elings et al. | 250/306 |
| 5,120,959 | 6/1992 | Tomita | 250/306 |
| 5,144,833 | 9/1992 | Amer et al. | 73/105 |
| 5,155,361 | 10/1992 | Lindsay | 250/307 |
| 5,157,251 | 10/1992 | Albrecht et al. | 250/216 |
| 5,189,906 | 3/1993 | Elings et al. | 73/105 |
| 5,200,616 | 4/1993 | Kokawa et al. | 250/306 |
| 5,202,004 | 4/1993 | Kwak et al. | 204/153.1 |
| 5,247,186 | 9/1993 | Toda | 250/561 |
| 5,253,516 | 10/1993 | Elings et al. | 73/105 |
| 5,260,824 | 11/1993 | Okada et al. | 359/368 |
| 5,291,775 | 3/1994 | Gamble et al. | 73/105 |
| 5,294,804 | 3/1994 | Kajimura | 250/561 |
| 5,296,704 | 3/1994 | Mishima et al. | 250/306 |
| 5,307,693 | 5/1994 | Griffith et al. | 73/862.68 |
| 5,314,254 | 5/1994 | Yashar et al. | 384/49 |
| 5,317,153 | 5/1994 | Matsushiro et al. | 250/306 |
| 5,319,960 | 6/1994 | Gamble et al. | 73/105 |
| 5,325,010 | 6/1994 | Besocke et al. | 310/317 |

(List continued on next page.)

OTHER PUBLICATIONS

Hamers, et. al., "A scanning tunneling microscopy study of the reaction of Si(001)–(2X1) with $NH_3$", J. Vac. Sci.Technol., Mar./Apr. 1988, A, vol. 6. No. 3, pp. 508–511.

(List continued on next page.)

*Primary Examiner*—Kiet T. Nguyen
*Attorney, Agent, or Firm*—D'Alessandro & Ritchie

[57] ABSTRACT

Features for incorporation with scanning probe microscopes are provided which may be used separately or together. The features include constructing the microscope with a hinged top housing providing easy access to the heart of the microscope; a self-aligning and torque limiting magnetic clutch coupling a motor drive powering at least one vertical adjustment screw of the microscope; a removable microscope head for easy adjustment; an optical microscope, optionally mounted to an electronic camera and imaging system, installed adjacent to the head; operation on an inverted microscope stage; bowing error correction; a gas sparging system providing contaminant and noise reduction; a glove box type of loading system so that reactive materials may be safely loaded into the microscope; and a compact desk-top chamber which provides acoustic and vibration isolation.

10 Claims, 16 Drawing Sheets

U.S. PATENT DOCUMENTS

| | | | |
|---|---|---|---|
| 5,357,105 | 10/1994 | Harp et al. | 250/234 |
| 5,363,697 | 11/1994 | Nakagawa | 73/105 |
| 5,388,452 | 2/1995 | Harp et al. | 73/105 |
| 5,440,920 | 8/1995 | Jung et al. | 250/306 |
| 5,479,013 | 12/1995 | Forster et al. | 250/306 |
| 5,500,535 | 3/1996 | Jing | 250/440.11 |
| 5,513,518 | 5/1996 | Lindsay | 73/105 |
| 5,515,719 | 5/1996 | Lindsay | 73/105 |

OTHER PUBLICATIONS

Jung, et al., "Novel Stationary–Sample Atomic Force Microscope with Beam–Tracking Lens", Electronic Letters, vol. 29, No. 3, Feb. 4, 1993, pp. 264–265.

Binnig, et al., "Single–tube three–dimensional scanner for scanning tunneling microscopy", Rev. Sci. Instrum. 57 (8), Aug. 1986, pp. 1688–1689.

Drake et al., "Imaging Crystals, Polymers, and Processes in Water with the Atomic Force Microscope", Science, vol. 243, Mar. 24, 1989, pp. 1586–1589.

Sonnenfeld, et al., "Atomic–Resolution Microscopy in Water", Science, vol. 232, Apr. 11, 1986, pp. 211–213.

Davidsson et al., "A new symmetric scanning tunneling microscope design", Journal of Vacuum Science & Technology: Part A, Mar./Apr. 1988, No. 2, pp. 380–382.

Marti et al., "Atomic force microscopy of liquid–covered surfaces: Atomic resolution images", Appl. Phys. Lett. 51 (7), Aug. 17, 1987, pp. 484–486.

Kirk et al., "Low–temperature atomic force microscopy", Rev. Sci. Instru., 59 (6), Jun. 1988, pp. 833–835.

Sonnenfeld et al., "Semiconductor topography in aqueous environments: Tunneling microscopy of chemomechanically polished (001) GaAs", Appl. Phy. Lett. 50(24), Jun. 15, 1987, pp. 1742–1744.

Martin, et al., "Atomic force microscope–force mapping and profiling on a sub 100–Å scale", J. Appl. Phys. 61 (10), May 15, 1987, pp. 4723–4729.

Travaglini et al., "Scanning Tunneling Microscopy on Biological Matter", Surface Science 181 (1987), pp. 380–391.

Ohnesorge et al., "True Atomic Resolution by Atomic Force Microscopy Through Repulsive and Attractive Forces", Science, vol. 260, Jun. 4, 1993, pp. 1451–1456.

Specht et al., "Simultaneous measurement of tunneling current and force as a function of position through a lipid on a solid substrate", Surface Science Letters 257, 1991, pp. L683–L658.

Hansma et al., "A new, optical–lever based atomic force microscope", J. Appl. Phys. 76 (2), Jul. 15, 1994, pp. 796–799.

O'Shea et al., "Atomic force microscopy of local compliance at solid–liquid interfaces", Abstract, Cambridge University, pp. 1–13, has no date.

Putman et al., "Viscoelasticity of living cells allows high–resolution imaging by tapping mode atomic force microscopy", Department of Applied Physics, University of Twente, has no date and page number.

Hansma et al., "Atomic force microscopy of DNA in aqueous solutions", Nucleic Acids Research, 1993, vol. 21, No. 3, pp. 505–512.

Lindsay et al., "Scanning tunneling microscopy and atomic force microscopy studies of biomaterials at a liquid–solid interface", J. Vac. Sci. Technol., A., vol. 11, No. 4, Jul./Aug. 1993, pp.808–815.

Lyubchenko et al., "Atomic Force Microscopy Imaging of Double–Stranded DNA and RNA", Journal of Biomolecular Structure & Dynamics, vol. 10, Issue No. 3, (1992), pp. 589–606.

Lyubchenko et al., "Atomic force microscopy of long DNA: Imaging in air and under water", Proc. Natl. Acad., Sci. USA, vol. 90, Mar. 1993, pp. 2137–2140.

Nagahara et al., "Preparation and characterization of STM tips for electrochemical studies", Rev. Sci. Instrum. 60 (10), Oct. 1989, pp. 3128–3130.

Bakalyar et al., "The Role of Dissolved Gases in High–Performance Liquid Chromatography", Journal of Chromatography, vol. 158, 1978, pp. 277–293.

Schueir, et al., "Creating and observing surface features with a Scanning Tunneling Microscope", SPIE, Scanning Microscopy Technologies and Applications, vol. 897, 1988, pp. 16–19.

SCANNING PROBE MICROSCOPE

CROSS-REFERENCE TO RELATED APPLICATION

This application is a continuation-in-part of co-pending U.S. patent application Ser. No. 08/388,068, filed 10 Feb. 1995 and entitled "Scanning Probe Microscope For Use in Fluids", in the name of the same inventors and assigned to the same entity. It is hereby incorporated herein by reference as if set forth fully herein.

BACKGROUND OF THE INVENTION

This invention relates to scanning probe microscopes, such as the scanning tunneling microscope (STM) and atomic force microscope (AFM), used for profiling the surface of a sample at high resolution. More particularly, the present invention relates to scanning probe microscope apparatus having a hinged motor drive apparatus, video optical microscope, bow correction, a desk-top isolation chamber, a gas sparging system and/or a glove box loading system.

Scanning probe microscopes make use of a fine probe tip which is scanned over the surface of a sample in order to record the topography of the surface by means of the interaction between the probe tip and a sample. A typical layout of an atomic force microscope 10 is shown in FIG. 1. Here, the sample surface 12 of sample 14 is sandwiched between a top sensing assembly 16 and a bottom scanning assembly 18. Sensing assembly 16 contains a laser 20 which emits a beam 22 that is reflected off of the back of a flexible cantilever assembly 24 to generate a reflected beam 26. Small motions of cantilever 28 of cantilever assembly 24 modulate the position of beam 26 and are detected by a position sensitive detector 30 which may be a bi-cell, multi-cell, or other type of light beam position sensitive measuring device. Scanning of the sample surface 12 is achieved by a piezo-electric transducer or "scanner" 32 which moves the sample both up and down (i.e., towards and away from flexible cantilever assembly 24 in the "Z" axial direction) and side to side in the "X-Y" planar direction (normal to the Z-axis), so as to generate a raster-scan of sample surface 12 under the cantilever 28. Scanner 32 is attached to a base 34 and positioning screw drives 36, 38 are used to position top sensing assembly 16 so that cantilever 28 is close to sample surface 12.

While fit for its intended purpose, the foregoing arrangement suffers from a number of drawbacks, most notably the fact that the sample 14 must be sandwiched between bottom scanning assembly 18 and top sensing assembly 16. Access to sample 14 is therefore restricted, so that the use of an optical microscope to examine sample 14 while in position on scanner 32 is made difficult. Sample mounting is also somewhat complex as is sample translation. It is desirable to be able to examine the scanning probe with an optical microscope as an aid to alignment of laser beam 22 onto the cantilever while the sample 14 and cantilever 24 are in place. In the past, this has been achieved by clearing a path for viewing as illustrated in FIG. 2. In FIG. 2, the incident laser beam 40 is now incident from one side, and deflected down onto the cantilever 42 by a beam-splitter 42 which is mounted on an optical window 44. The reflected beam 46 from the back 48 of cantilever 42 is picked off by a mirror 50 which transmits reflected beam 52 to the detector (not shown in FIG. 2, but disposed along the path of beam 52). A long-working-distance objective 54 of an optical microscope 56 is placed over the top of optical window 44 and focused onto the back 48 of cantilever 42. This arrangement requires that the scanning probe microscope be situated at the position normally occupied by the optical microscope stage. This requires the use of an optical microscope considerably larger than the scanning probe microscope itself. In addition, the whole assembly must then be set on a large table located so that an operator can have access to the eyepieces of the optical microscope. Since vibration isolation is required for high resolution scanning probe microscopy, an expensive and cumbersome air-table is usually required for optimum results.

It is often desirable to observe the sample from below while it is scanned from above. This may be done if the sample is transparent by placing the scanning assembly on the optical stage of an inverted optical microscope. An example of such an arrangement is the BioScope™ available from Digital Instruments, Inc. of Santa Barbara, Calif. It is shown schematically in FIG. 3. A massive frame 58 holds a scanning probe assembly 60 with a probe 62 lowered down onto the sample 64 which is on the stage 66 of an inverted optical microscope 68, the objective lens of which is shown as 70. The detector 72 for reflected light 74 from laser beam 76 is held off to one side of the probe assembly 60 and both are rigidly attached to a rigid and massive frame 58 which is also rigidly attached to the stage 66. Once again, a large support such as an air table is required to support the whole assembly in order to achieve optimum results.

Many of the problems associated with the conventional scanning probe microscope of FIG. 1 were solved by an invention disclosed by S. M. Lindsay and T. Jing in U.S. patent application Ser. No. 08/388,068 entitled: "Scanning Probe Microscope for Use in Fluids" The scanning probe microscope arrangement of the above-identified disclosure is illustrated generally in FIG. 4. Here, a single microscope body 78 holds both mechanical vertical tripod adjustments 80, 82 and 84 and sample stage 86 which is held on to the bottom of the mechanical adjustments by magnetic balls, two of which are shown at 88 and 90. The scanning assembly 92 scans either an STM probe or an AFM probe over the surface of a sample which is attached to the upper surface 94 of sample stage 86. In this way, the sample may be accessed from below. A containment may be used to surround the sample so as to control the sample environment. A motor 96 which drives at least one of the mechanical adjustments 80, 82, 84 (here, 80) is housed on an assembly 98 which is seated on top of the microscope body 78. Motor 96 is coupled to mechanical adjustment 80 which may be a screw driven by a sleeve 100 which permits translation of the screw 80 as it is rotated. In order to gain access to the other adjustments 82, 84, it is necessary to have an opening 102 in the housing 104. Even so, it can be difficult to make adjustments to the scanning assembly 92.

In order to realize this top-down scanning arrangement for the AFM, a tracking method is required so that the laser beam remains aligned on the force sensing cantilever as it is moved over the surface of the sample. Such an arrangement has been achieved by a prior invention disclosed by P. S. Jung and D. R. Yaniv in U.S. Pat. No. 5,440,920, hereby incorporated herein by reference. A general arrangement of this optical tracking scheme is shown in FIG. 5A. A lens 106 is used to focus a collimated beam 108 from a laser (not shown) onto the reflective back 110 of a cantilever-type probe 112. Both the lens 106 and the cantilever-type probe 112 are physically coupled to or constrained to move with the scanning transducer 114. In this way, a focused laser spot from beam 108 tracks and follows cantilever 112 as it is moved over the surface of the sample. This action is illustrated in FIG. 5B. The transducer 114 is bent so as to move the tip 116 of probe 112 to a new position. Lens 106 has been translated with scanning transducer 114, so that the focused laser spot remains on the back 110 of the cantilever 112.

FIG. 5B illustrates a problem associated with this method of tracking the incident beam with the cantilever. It does not compensate for the angular deflection of the cantilever due to the bending of the scanner. Since this angular deflection adds or subtracts from the angular deflection whereby changes in height of a scanned sample are detected, it introduces an error in the output signal of the detector which causes a flat surface to appear to be curved or "bowed". When the microscope is scanning a sample, this bow can become quite complicated. For example, if the cantilever probe is in contact with the sample surface and adhering to it, when the transducer is pushed forward and up in order to lift the cantilever from the surface (as shown in FIG. 6A) the microscope can become unstable because the cantilever will jump from the surface when the force pulling it up becomes comparable to the adhesion force. Furthermore, the direction of the bowing error is difficult to predict because it depends upon the location of the laser spot on the cantilever. The bowing is more predictable in the opposite scan direction where (as shown in FIG. 6B) the tip tends to be pushed into the surface. The tip is also more stable in this configuration, but, for a given deflection of the laser beam, the contact force between the probe and the sample is significantly increased as the tip is pushed into the surface. This is a disadvantage when scanning soft surfaces. U.S. Pat. No. 5,440,920, discussed above, describes a solution to this problem using an "S"-shaped scanner. According to this arrangement, a pair of scanning tubes are connected together in a manner which results in translation without angular deflection. However, this arrangement may not always be desirable because it requires a longer scanning tube which can result in the introduction of more mechanical drift and noise in the system.

OBJECTS AND ADVANTAGES OF THE INVENTION

Accordingly, it is an object of the present invention to provide a scanning probe microscope in which an adjustment motor is placed above the scanning stage in a manner which permits easy access to the scanning stage for adjustments.

It is a further object of the present invention to provide a magnetic clutch for coupling a motor controlling an adjustable leg which in turn supports a sample platen of a scanning probe microscope.

It is a further object of the present invention to provide a microscope in which optical access is available so that the position of the laser spot on the back of the cantilever is easily imaged by an optical microscope to aid alignment of the microscope.

It is another object of the present invention to provide a television camera or similar imaging device in the optical path from the back of the atomic force microscope cantilever in order to provide electronic images of the position of the light beam of the back of the cantilever.

It is yet another object of the present invention to provide a microscope that can also be placed onto the stage of an inverted optical microscope so that an optically transparent sample being scanned may be viewed from below.

It is yet another object of the present invention to reduce or eliminate bowing errors without the need of a large increase in the total scanner length for a given scanning range.

It is yet another object of the present invention to provide a glove box type of loading system for a scanning probe microscope.

It is yet another object of the present invention to provide a gas sparging system for use with a scanning probe microscope.

It is yet another object of the present invention to provide a convenient, desk-top anti-vibration and acoustic isolation system.

These and many other objects and advantages of the present invention will become apparent to those of ordinary skill in the art from a consideration of the drawings and ensuing description of the invention.

SUMMARY OF THE INVENTION

Features for incorporation with scanning probe microscopes are provided which may be used separately or together. The features include constructing the microscope with a hinged top housing providing easy access to the heart of the microscope; a self-aligning and torque limiting magnetic clutch coupling a motor drive powering at least one vertical adjustment screw of the microscope; a removable microscope head for easy adjustment; an optical microscope, optionally mounted to an electronic camera and imaging system, installed adjacent to the head; operation on an inverted microscope stage; bowing error correction; a gas sparging system providing contaminant and noise reduction; a glove box type of loading system so that reactive materials may be safely loaded into the microscope; and a compact desk-top chamber which provides acoustic and vibration isolation.

BRIEF DESCRIPTION OF THE DRAWINGS

FIG. 5A shows the scanning tube prior to deflection and FIG. 5B shows the scanning tube after deflection.

FIG. 6A shows the deformation when the transducer swings up so as to lift the cantilever from the surface. FIG. 6B shows the deformation when the transducer pulls back so as to push the transducer into the surface.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Hinged Head Assembly and Magnetic Clutch Mechanism

Figure 7:
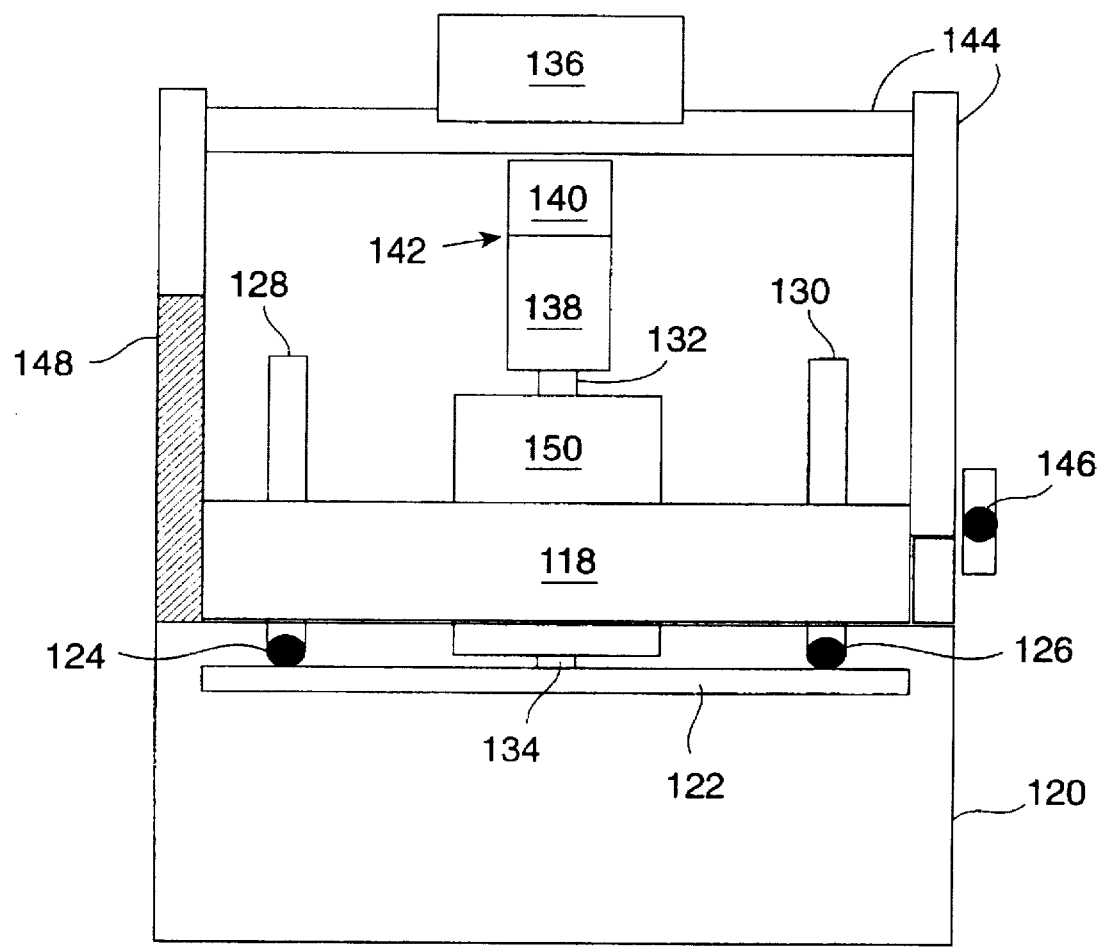
FIG. 7 shows a general layout of the scanning probe microscope according to a presently preferred embodiment of the present invention.

Turning now to FIG. 7, a side elevation view of the scanning probe microscope having a hinged housing according to a presently preferred embodiment of the present invention is shown. The microscope body 118 rests on a supporting base 120 which may also preferably serve as a hermetically sealed sample enclosure. The sample stage 122 is fabricated from material that is attracted to magnets and is held in place on three magnetic balls, two of which are shown as 124 and 126, which are affixed to the end of mechanical linear positioners, such as screw drives 128, 130 and 132. The scanning probe 134 protrudes into the area above sample stage 122. One of the mechanical linear positioners, 132, is a screw coupled to a motor 136 driven in order to permit automated advance of the sample on sample stage 122 towards the scanning probe 134. The motor 136 is coupled to screw 132 by a coupling sleeve 138 that is free to ride up and down on the shaft of screw 132, but grips it for rotational motion as shown in more detail in FIG. 9. The coupling sleeve 138 is coupled to the motor drive shaft 140 by a self-aligning magnetic clutch assembly 142 (shown in more detail in FIG. 9). The motor, 136 is mounted on a head assembly 144. The head assembly 144 is connected, at one point on its circumference, by a hinge 146 which permits the head assembly 144 to swing back with respect to the microscope body 118. An opening 148 in head assembly 144 permits access to the inside of head assembly 144 when head assembly 144 is in the down or closed position shown in FIG. 7, allowing the operator to view probe 134 via a window in the scanning assembly 150 either directly or with an optical microscope.

Figure 8:
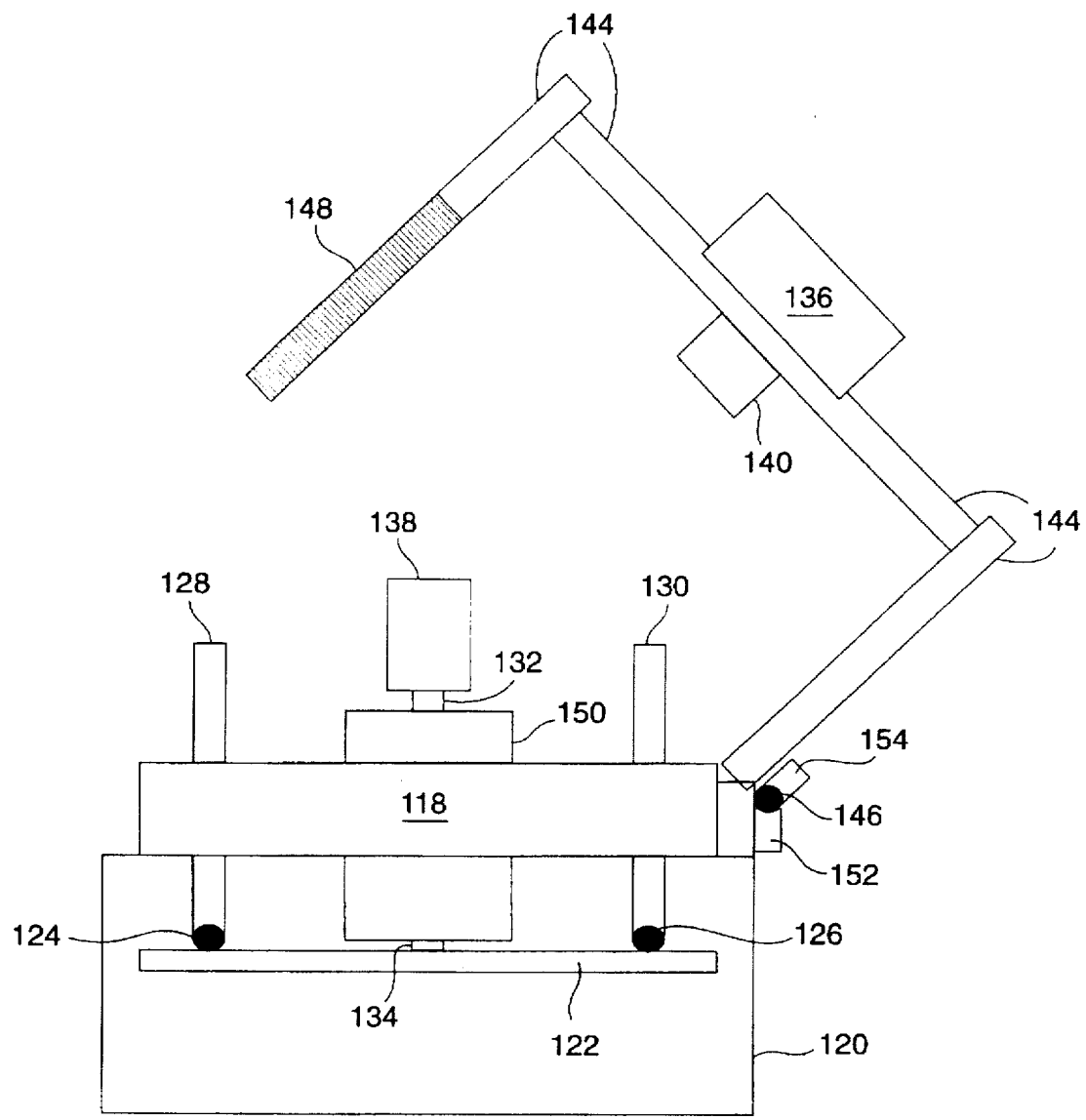
FIG. 8 shows the microscope of the present invention with the head swung back to disengage the motor and expose the scanning head according to a preferred embodiment of the present invention.

The head assembly 144, as open and swung back for access to the alignment screws 128, 130, is shown in FIG. 8. The head assembly 144 rests on the hinge assembly 146 which is, in turn, connected to the body 118 of the microscope. While the head assembly 144 is open, the magnetic clutch 142 is disengaged so that its bottom part 138 rests on screw 132 while its top part 140 remains attached to motor 136. The bottom element 152 of hinge assembly 146 is shaped so that the top element 154 of hinge assembly 146 comes to rest on it with the microscope head assembly 144 pulled back at a convenient angle as shown in FIG. 8. By these means, easy access is gained to the adjustment screws 128 and 130 and the scanner assembly 150 by the simple expedient of pulling the head assembly 144 back. When the head assembly 144 is closed against the body 118, the magnetic clutch engages and self-aligns, so that the microscope is immediately ready for operation. The head assembly 144 is preferably retained in its (normal) closed position by spring-loaded pins (not shown) which are pushed in (or released) by the operator in order to swing the head back for access.

Figure 9:
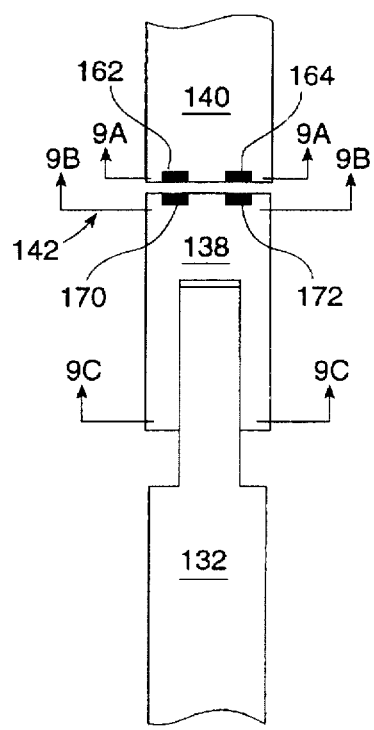
FIG. 9 shows the magnetic clutch and drive-sleeve which releasably couple the motor to the adjustment screw according to a preferred embodiment of the present invention.
Figure 9A:
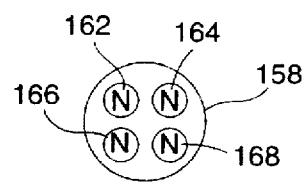
FIG. 9A is a cross sectional view taken along line 9A—9A of FIG. 9.
Figure 9B:
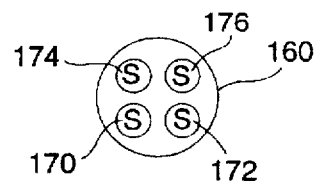
FIG. 9B is a cross sectional view taken along line 9B—9B of FIG. 9.
Figure 9C:
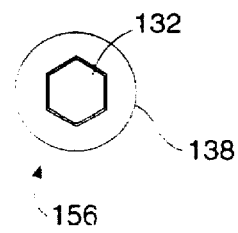
FIG. 9C is a cross sectional view taken along line 9C—9C of FIG. 9.

The arrangement of the magnetic clutch 142 is shown in more detail in FIG. 9. The sleeve or bottom part 138 of the clutch 142 rides on motor driven adjustment screw 132 and is capable of translation up and down while still grasping the screw 132 for rotation. This is because a non-circular and/or keyed cross-section is used for this sleeve 138 as shown, for example, at 156 where sleeve 138 surrounds hexagonal adjustment screw 132 as shown so that up-down motion is permitted, but not relative rotational motion. More detail of the magnetic clutch 142 is shown at 158 and 160. Four magnets 162, 164, 166, 168 are preferably mounted in the top of the motor drive shaft 140. Similarly, four mating magnets 170, 172, 174, 176 are mounted in the top of sleeve 138 as shown. The magnets may be mounted with all north poles projecting downward from motor drive shaft 142 and all south poles projecting upwardly from sleeve 138 so that simple engagement may be achieved every 90 degrees. Alternatively, a different keying scheme may be used so that only one orientation is possible is such an arrangement is desired, for example, 3 norths and a south from the top could mate with 3 souths and a north from the bottom so that engagement between parts 138 and 140 could only occur in one angular orientation. Used with small rare-earth disk magnets (e.g., 3/16" diameter) this arrangement gives ample force to pull the sleeve up into position from as much as a centimeter and ample torque to drive the adjustment screw 132. Yet it offers very little resistance when the head is tilted back. Thus, the motor assembly is automatically disconnected and reconnected each time the head is tilted away and back again without the need for any complicated mechanical connection/disconnection..

Optical Train

Figure 10:
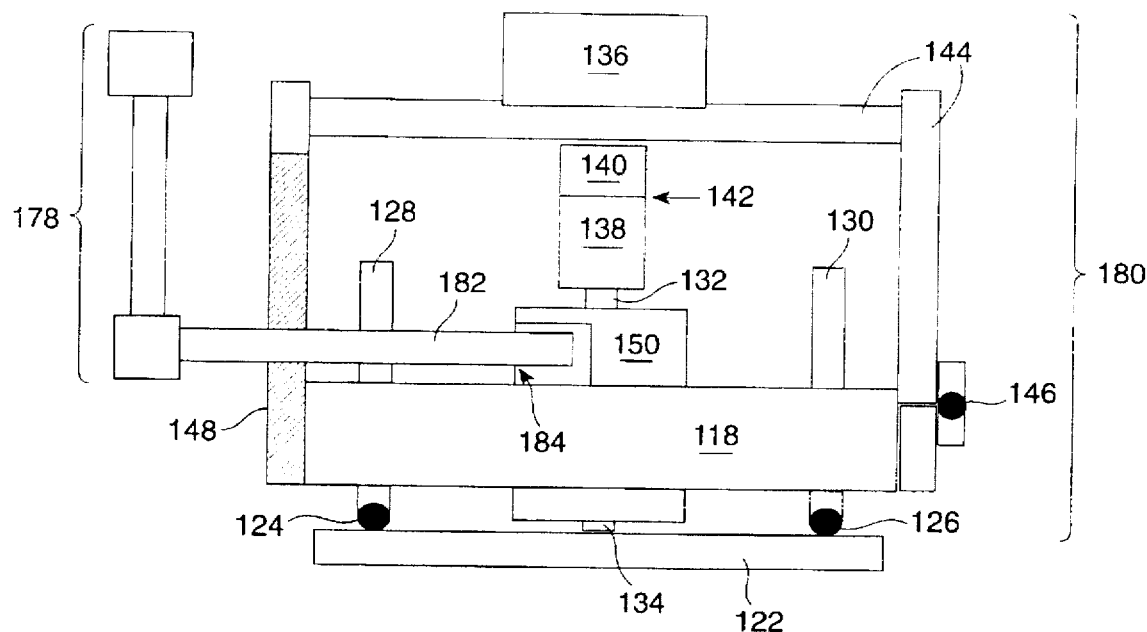
FIG. 10 shows the placement of a video microscope for viewing the back of a cantilever-type probe in a scanning probe microscope according to a presently preferred embodiment of the present invention.
Figure 11:
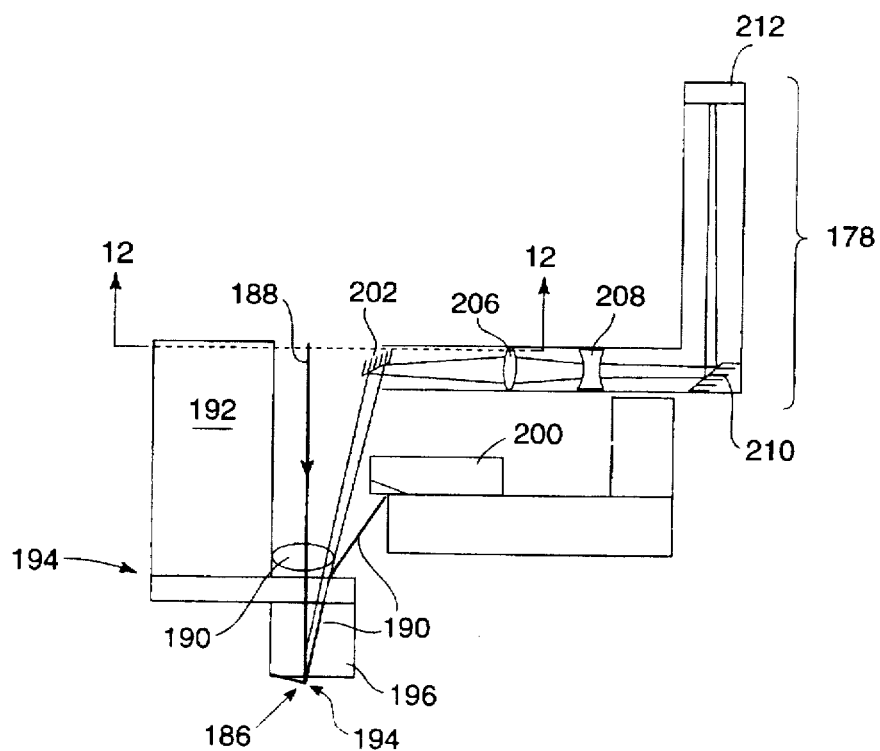
FIG. 11 is a side view showing the optical train used in the video microscope portion of a scanning probe microscope according to a presently preferred embodiment of the present invention.

An optical microscope 178 which allows the top of the AFM cantilever of the scanning probe to be monitored during alignment and scanning is shown in FIGS. 10 and 11. FIG. 10 shows the overall arrangement of optical microscope 178 in relation to the scanning probe microscope 180. The optical microscope assembly 178 is mounted onto the scanning probe microscope body 118. The front part 182 of the optical microscope 178 passes through an opening 184 in scanner assembly 150 so that a view of the scanning cantilever is possible. The opening 148 allows the head assembly 144 to swing back to the open state while the optical microscope 178 remains attached to the scanning probe microscope body 118.

Figure 12:
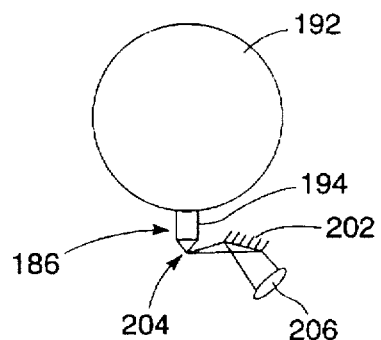
FIG. 12 is a top plan view taken along line 12—12 of FIG. 11 of the front of the optical train used in the video microscope portion of a scanning probe microscope according to a presently preferred embodiment of the present invention.

The optical train or path of the scanning probe microscope AFM head is shown in FIG. 11. This figure shows the optical train used for sensing deflection of cantilever 186, so that the relationship between the two optical systems is clear. A collimated laser beam 188 from a laser (not shown in FIG. 11) passes through a converging lens 190 attached to scanner 192 preferably at or near its bottom 194. Beam 188 is focused down onto the back 194 of cantilever 186 which is held in the glass block 196 attached to the bottom 194 of scanner 192. The reflected beam 198 from the back 194 of cantilever 186 is incident on position sensitive detector 200. The optical microscope 178 is arranged so as to view the back portion 194 of cantilever 186 as illuminated by the incident beam 188 of the laser. A small mirror 202 is set to one side of and just above position sensitive detector 200 so as to collect some light from the back 194 of cantilever 186. This arrangement is illustrated in a top plan view in FIG. 12 as taken along line 12—12 of FIG. 11. The laser spot 204 is seen on the back 194 of cantilever 186 in this view. Mirror 202 sits off to one side of the detector 200 (the detector is situated above the laser spot and not shown in FIG. 12). Diffuse light from the back 194 of cantilever 186 is passed to a first lens 206. Returning to the side view (FIG. 11), first lens 206, second lens 208 and bending mirror 210 form an image of the back 194 of cantilever 186 on the image plane of a charge coupled device (CCD) camera 212. The long-working distance required by the lens assembly of lenses 206 and 208 (typically 40 mm) limits the magnification of the system to 5 or 10 times if the distance to the camera 212 is not to be unwieldy. However, this is adequate to fill the sensitive area of a CCD imaging chip (approximately a 1 mm by 1 mm square) with a view of the cantilever back 194 (approximately a 0.1 mm by 0.1 mm image area). The remainder of the magnification is purely electronic and results from the projection of the CCD image from camera 212 onto a TV monitor (not shown).

Figure 13:
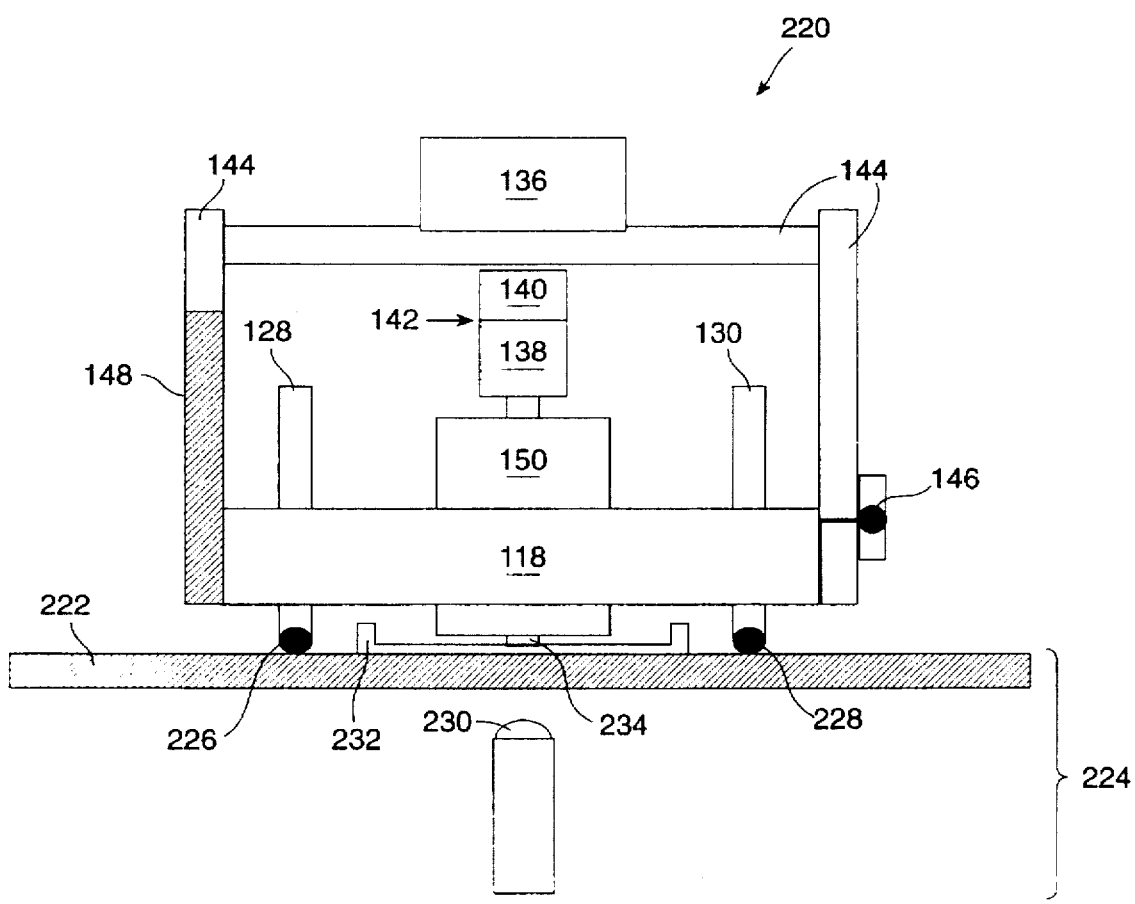
FIG. 13 is a cross-sectional side view of the microscope placement on an inverted optical microscope stage in a scanning probe microscope according to a presently preferred embodiment of the present invention.

In another embodiment of the system, shown in FIG. 13, the microscope 220 may be placed on the optical stage 222 of an inverted microscope 224 so that the scanning of a transparent sample may be viewed from below. This is achieved using the free-standing mode of operation of the microscope as described in U.S. patent application Ser. No. 08/388,068, referred to above. The sample stage has been removed so that the magnetic balls, two of which are shown at 226, 228, now ride on the glass stage 222 of an inverted optical microscope 224. The objective lens 230 of the inverted optical microscope 224 is focused through a transparent sample container or substrate 232 onto the region scanned by the scanning probe 234. The position of the microscope 220 on sample stage 222 of optical microscope 224 is adjusted by means of micrometer screws (not shown) which translate the whole assembly 220 over the surface of the glass plate 220 of the optical stage of the inverted microscope 224. These optical stages are normally rigid and smooth, and form an ideal surface for moving the microscope over.

Bow Error Correction and Reduction

Figure 14:
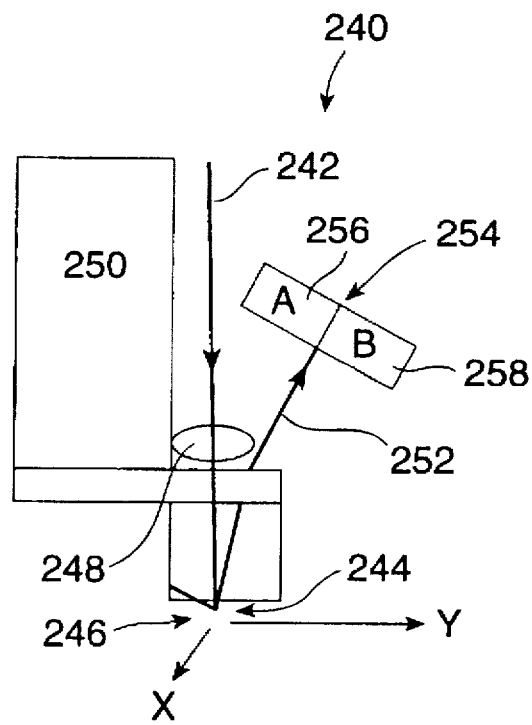
FIG. 14 shows the relationship of a scan direction (chosen to be the "Y" axis here) to the deflection signal generated by cantilever distortions due to the angular swing of the scanner in a scanning probe microscope according to a presently preferred embodiment of the present invention.
Figure 15:
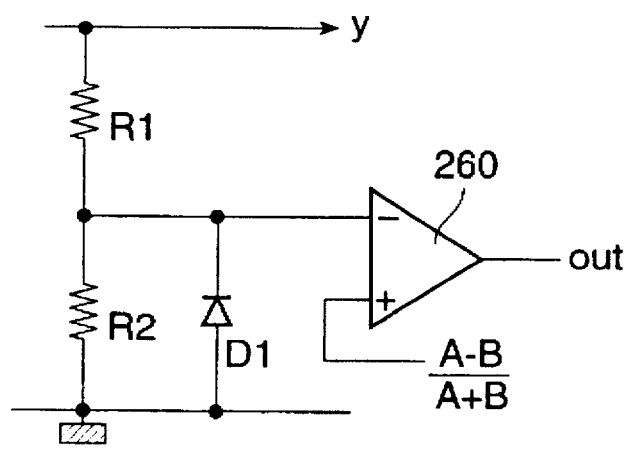
FIG. 15 shows an electronic circuit for compensating for bow so that contact force is not increased in a scanning probe microscope according to a presently preferred embodiment of the present invention.

The bow-correction system useable with the scanning probe microscope hereinbefore described is illustrated in FIGS. 14 and 15. The geometry of the top-down scanner 240 is illustrated in FIG. 14. The collimated laser beam 242 from a laser light source (not shown in FIG. 14) is focused onto the back 244 of a cantilever probe 246 by a converging lens 248. Both the lens 248 and cantilever 246 are preferably attached to the bottom (or near the bottom) of a scanner element 250. The reflected beam 252 falls onto a position sensitive detector 254. Detector 254 is arranged to sense vertical movement of the cantilever by means of the arrangement of two segments 256 (A) and 258 (B). Segments 256 and 258 are positioned so that if the cantilever 246 moves up, then more light is reflected onto segment 256. Segment 256 produces an output signal A and segment 258 produces an output signal B. The deflection signal is obtained from the difference between the signals from the two segments, A−B divided by their sum A+B so that the deflection signal is independent of the absolute magnitude of the laser signal, reflection, etc. In FIG. 14, movement of the probe is defined in the direction formed by the intersection of the plane of the beams 242 and 252 and the sample surface plane as movement in the y direction. Movement in the perpendicular direction in the plane of the sample surface is in the x direction. Bow is caused by the fact that the scanner 250 does not remain on a fixed plane, but introduces vertical motion and angular deflection as the scanner tube is bent in order to scan. Bow in the x direction will not affect the signal (A−B)/(A+B) unless the unwanted deflection is so large that it causes the reflected beam 252 to miss detector 254 entirely. Bow caused by the y scan does introduce undesirable signal, and, as shown earlier, it has the effect of causing the cantilever 246 to be pushed down into the surface being scanned when the scan is away from the detector and to be pulled up from it when the scan is towards the detector. This is the result of the action of the feedback control system used with scanning probe microscopes and well known to those of skill in the art which moves the scanner up and down in an attempt to keep the deflection signal constant. Pulling up can have the undesirable effect of causing cantilever 246 to lift-off the surface being scanned, but this only happens at large angular excursions, so the effect is easily minimized by using a relatively long scanning tube. Pushing down into the surface is always undesirable because it increases the tracking force used in the microscope and this disrupts soft surfaces such as biological materials which it is desirable to be able to scan. However, this error is approximately linear as a function of scan voltage. It can be corrected for by adding a voltage proportional to the scan voltage to the deflection signal in such a sense as to cause the scanner to lift up in just an amount to compensate for the pushing-down that would occur otherwise. This is done with the circuit shown in FIG. 15. A fraction of the y-scan voltage (denoted signal "y") is set by the resistive divider comprising resistors R1 and R2. In one direction of scan (the y sweep away from the detector), this signal is subtracted from the deflection signal A−B/A+B using operational amplifier 260. In the other direction of scan (where the y scan polarity is reversed and the cantilever sweeps towards the detector) the signal is shorted out by the diode D1 and no correction is applied. The ratio, R1/R2, depends upon the sensitivity of the scanner element 250. This design of correction circuit can accommodate different scanners through the simple expedient of placing R2 (for example) in the scanner body, so that, as the scanner is changed, so is the value of R2. Similarly, a variable resistor could also be used and set in any of a number of ways well known to those of ordinary skill in the art.

Figure 1:
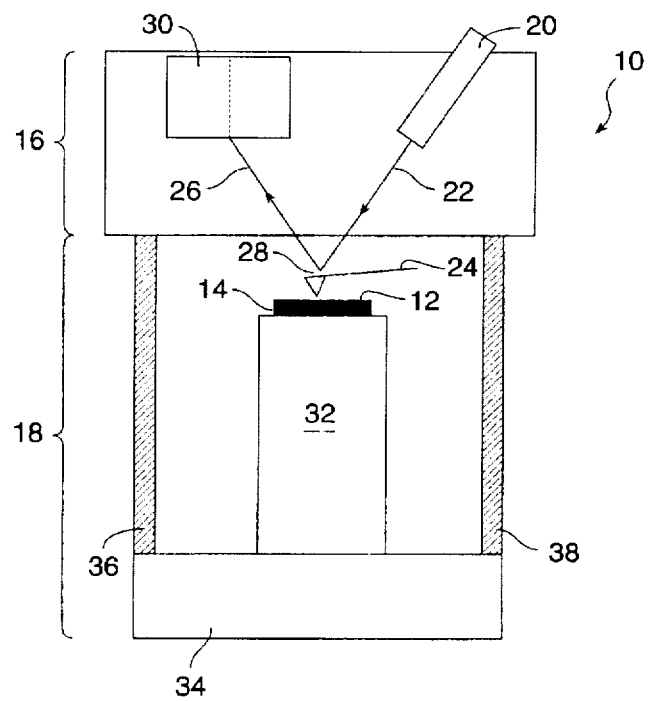
FIG. 1 shows a typical arrangement of an atomic microscope according to the prior art.
Figure 2:
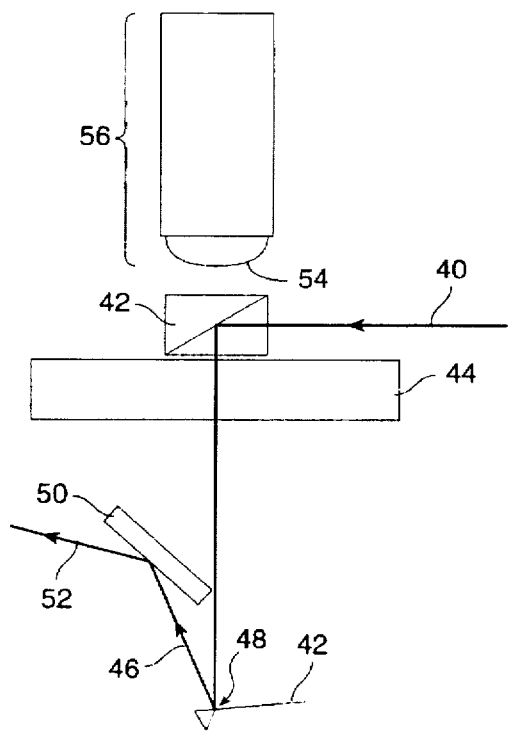
FIG. 2 shows an arrangement for optical microscope access to the back of a scanning cantilever-type probe according to the prior art.
Figure 3:
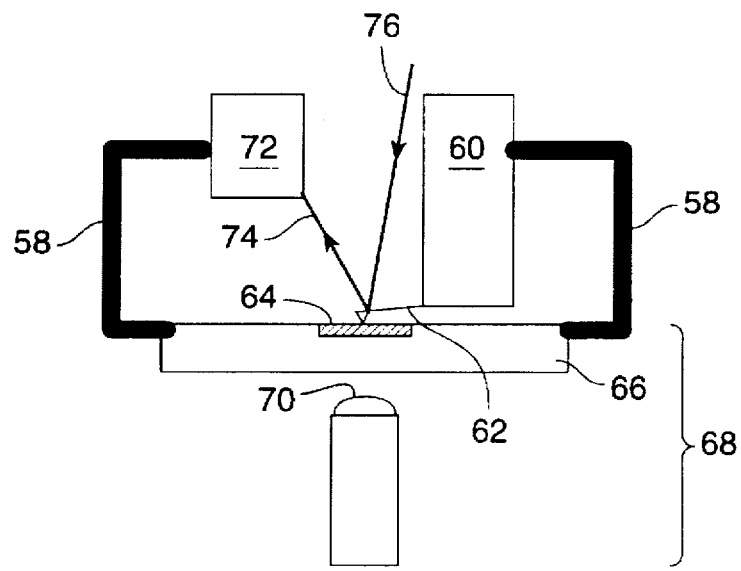
FIG. 3 shows a scanning probe microscope for use on an inverted optical microscope according to the prior art.
Figure 4:
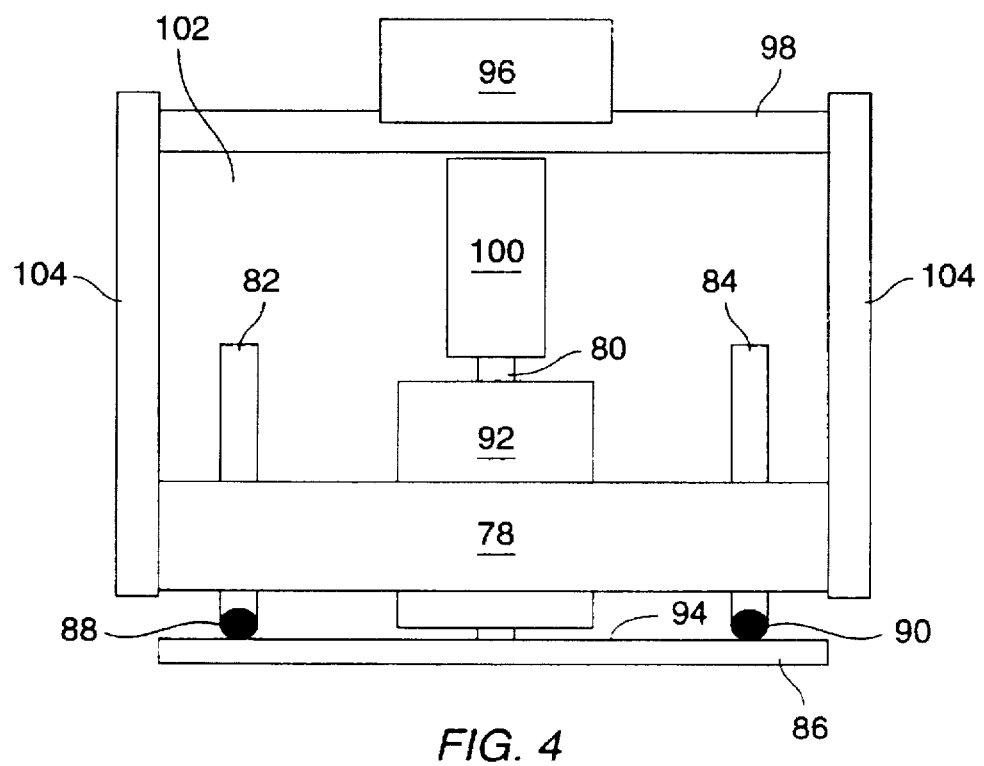
FIG. 4 shows the arrangement of a scanning probe microscope with the adjustment screws and motor mounted above the sample.
Figure 5A:
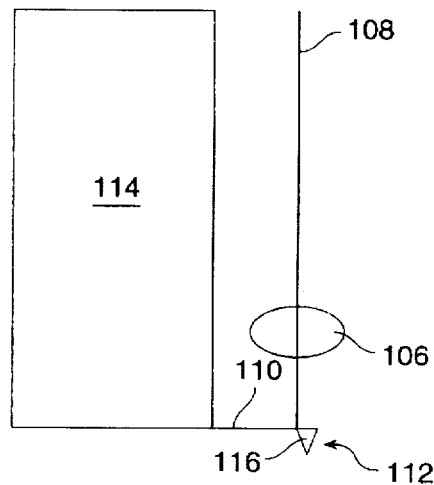
FIGS. 5A and 5B show an optical tracking system according to the prior art whereby the laser spot remains focused on the cantilever as it is scanned over the sample.
Figure 5B:
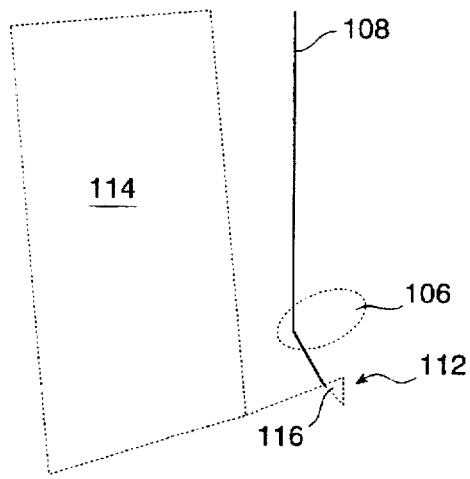
Figure 6A:
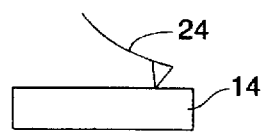
FIGS. 6A and 6B shows deformations of the cantilever during scanning which give rise to bowing error.
Figure 6B:
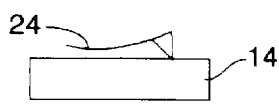

Alternatively, the bow can be corrected by use of a novel scanner arrangement as described below. This novel scanner has the advantage of eliminating the lift-off of the cantilever when a large displacement is made in the direction that lifts the cantilever (as shown in FIG. 6A). The distortion of the cantilever due to bow is determined by the angle formed by the bending of the scanning tube in the y direction (as defined in FIG. 14). P. S. Jung and D. R. Yaniv, supra, and Elings et al., in U.S. Pat. No. 5,306,919, describe a scheme for removing angular displacements of the cantilever of a scanning probe microscope by using two equal and opposite angular deflections of a long tube, so that the total displacement describes an "S"-like shape, the end of the tube being translated but not subject to angular deflection. As previously stated, this scheme requires the use of a substantially increased length of scanning tube for a given range of scan. While fit for its intended purpose, this configuration is both electrically and mechanically more noisy than a shorter tube. Since, however, it is correction of the angular deflection that is required, it is not necessary to use tubes of equal dimension to achieve the benefits of the device described by Jung et al. and Elings et al. Elings et al., in another approach described in U.S. Pat. No. 4,871,938, describe an STM system where the tip is placed on one side of the tube at its circumference and that side is deflected so as to compensate for the angular deflection. However, while fit for its intended purpose, this arrangement results in a substantial reduction of the scan range available from a given tube employing the invention herein.

Figure 16A:
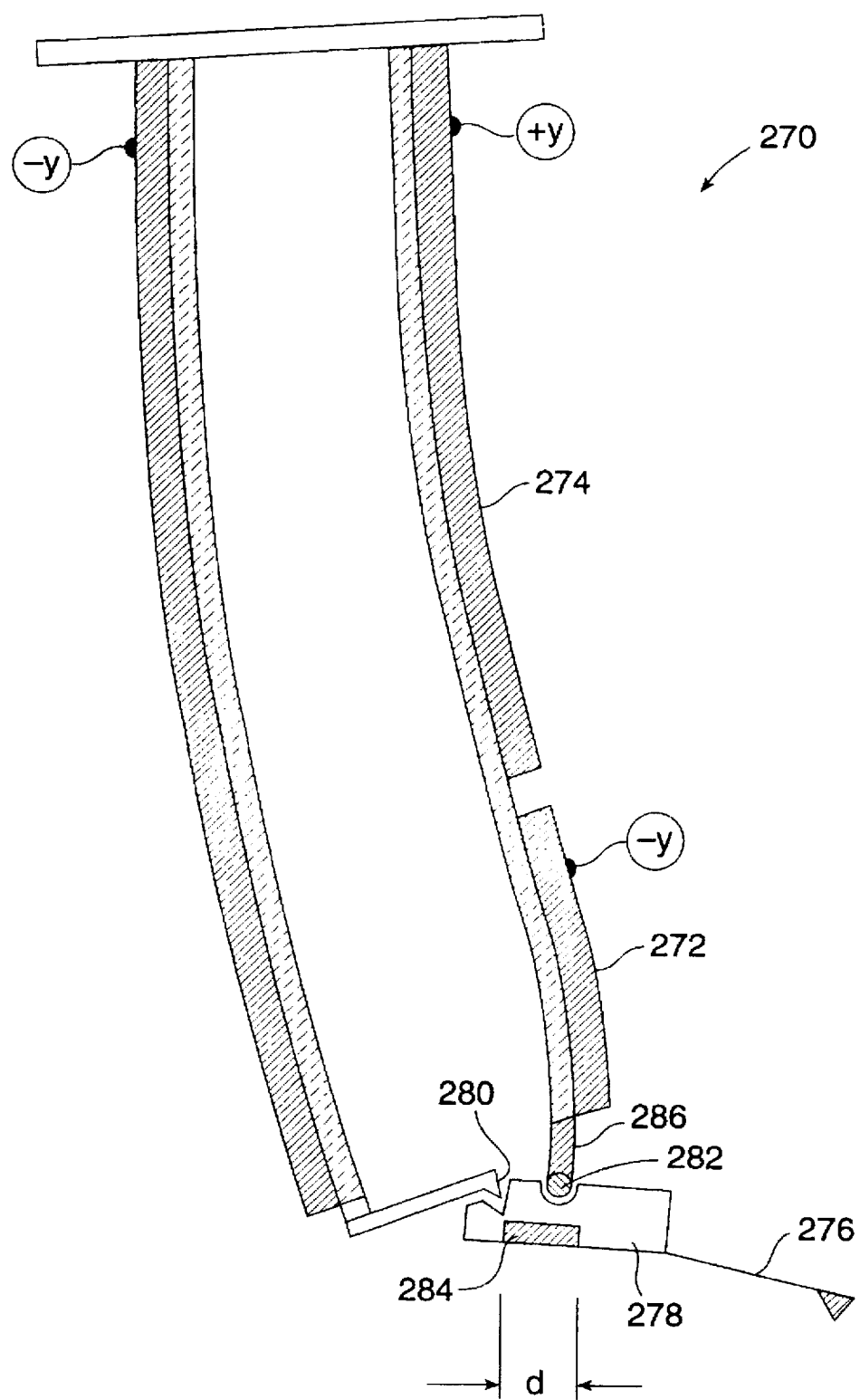
FIG. 16A is a cross-sectional diagram of a bow-compensating scanner according to a presently preferred embodiment of the present invention.
Figure 16B:
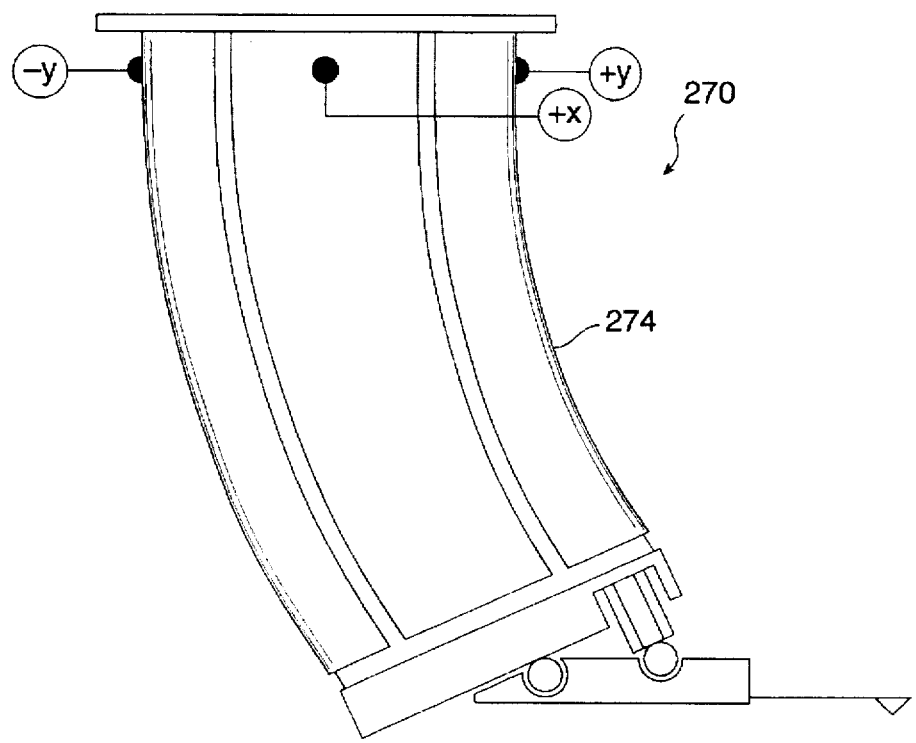
FIG. 16B is a side view of a bow-compensating scanner according to a presently preferred embodiment of the present invention.
Figure 16C:
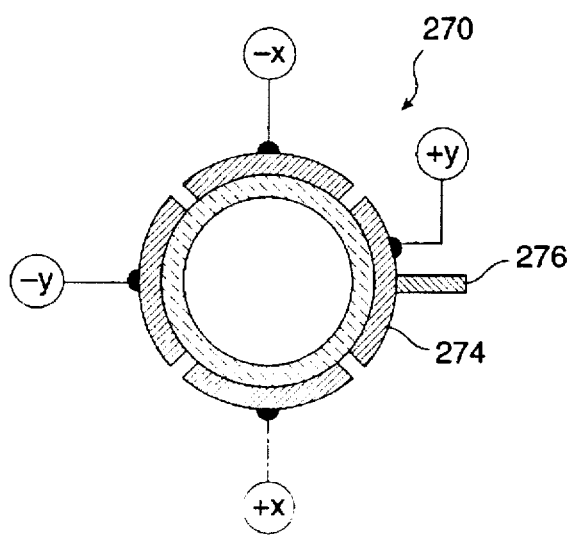
FIG. 16C is a top view of a bow-compensating scanner according to a presently preferred embodiment of the present invention.

The same corrective effect can be obtained by using a much shorter opposing deflection, but by applying it across a much shorter distance, so that the total angular correction is the same as would be obtained with a longer tube bent over a longer distance. A scanner 270 according to this invention is shown in FIG. 16A in cross section. A side view is shown in FIG. 16B and a top view is shown in FIG. 16C. In a conventional scanner, there are four electrodes disposed along the length of the scanner tube. These are generally denoted, travelling about the circumference in clockwise fashion, +Y, +X, −Y, and −X. The +X electrode is opposite the −X electrode and the +Y electrode is opposite the −Y electrode. The +X and −X segments are connected to voltages of opposite polarity so that as one side of the tube is expanded in response to the application of a positive voltage, the other side will contract due to application of a negative voltage. The net effect is that the tube bends in a controlled manner in response to the application of voltages.

According to a presently preferred embodiment of the present invention, a short segment 272 of the +Y electrode 274 is isolated to form a separate electrode and that electrode is powered by the −Y voltage supply. Thus the lower portion of the scanning tube on the +Y side is deflected in a direction opposite to the remainder of the tube on the +Y side. If the length of opposing electrode 272 is less than half the total length of the scanner tube 270, then the opposing angular deflection is less than that needed to compensate for the angular deflection caused by the upper part of the tube. If however, the small, opposing displacement from opposing electrode 272 is applied across a distance much less than the diameter of the scanner tube 270, a larger compensating angular deflection can be generated. According to a presently preferred embodiment of the present invention, cantilever probe assembly 276 is mounted on a rocking block 278 held in place on a wedge-shaped fulcrum 280 and a ball 282 by the action of a magnet 284 that pulls rocking block 278 up against ferromagnetic material 286 on the end of scanner 270. The distance "d" between fulcrum 280 and ball 282 is chosen such that the angular deflection due to the opposing electrode 272 is equal in magnitude (but opposite in sign) to the angular deflection produced in the y direction by the rest of the tube.

It is to be appreciated that ball 282 can be fabricated of a magnet and attached to block 278, thus obviating the need for magnet 284, similarly, portion 286 could be fabricated of a magnet, ball 282 of a material attracted to magnets, and magnet 284 obviated. Other similar arrangements will appear to those of ordinary skill in the art.

Figure 16D:
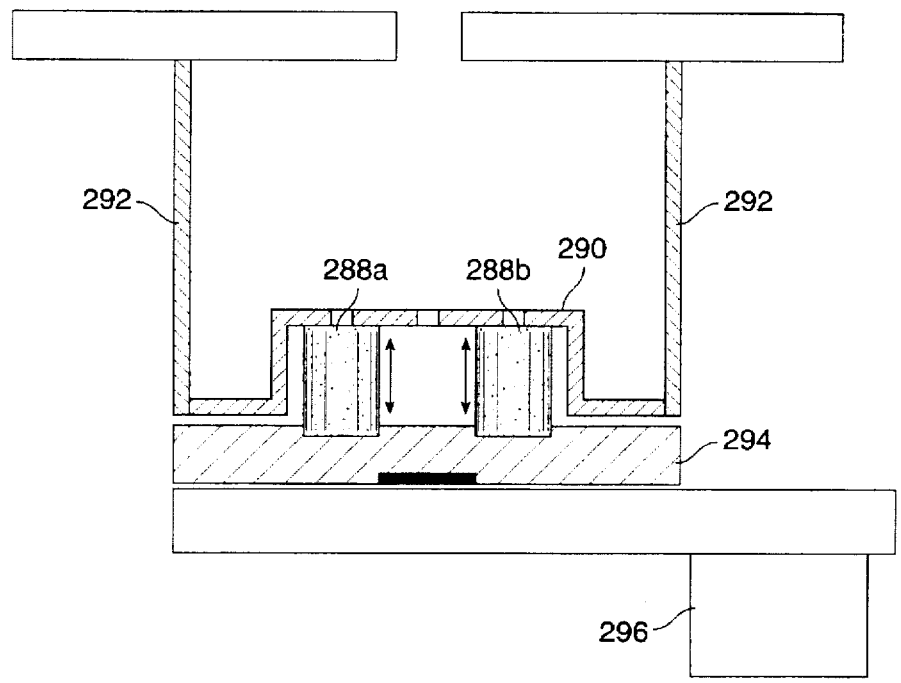
FIG. 16D is a side view of a bow-corrected scanning probe microscope utilizing a pair of cooperating piezoelectric cylinders according to a presently preferred embodiment of the present invention.

Another embodiment of a bow-correction system is shown in FIG. 16D. This version uses two small piezoelectric cylinders, shown as 288a and 288b in FIG. 16D. Each cylinder has an outer and an inner electrode surface allowing it to be expanded or contracted in vertical length. One end of each cylinder is rigidly attached to a housing 290 which is in turn, rigidly attached to the free end of the main scanning tube 292. The lower ends of the tubes 288a and 288b are rigidly attached to a cantilever housing 294 to which the force sensing cantilever 296 is, in turn, attached. The required angular displacement is obtained by contracting one tube (e.g., 288a) and expanding the other (e.g., 288b). The deflection signal is somewhat reduced because of the stiffness of the mounting elements (i.e., the tubes 288a and 288b) but this arrangement has the advantage of increased mechanical stability. Once again, by placing two small tubes close together, an adequate angular deflection can be obtained, without the disadvantage of a reduced scan range as in the prior art. The control of the signals necessary to accomplish this can be supplied by a power supply under the control of a computer as well known to those of ordinary skill in the art.

Figure 17:
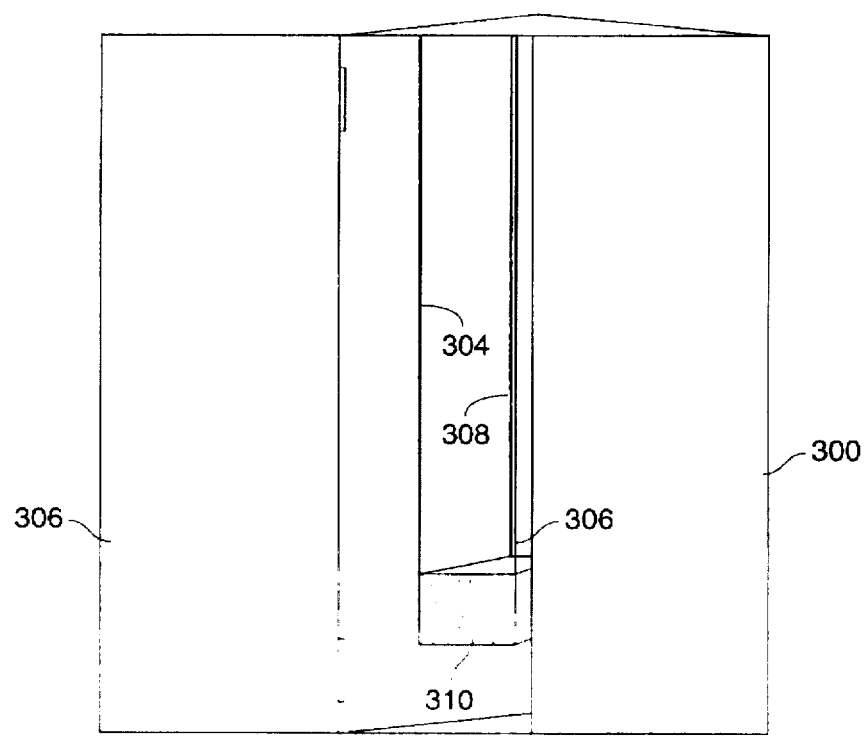
FIG. 17 shows a desk-top vibration and acoustic-noise isolation chamber for use with a scanning probe microscope according to a presently preferred embodiment of the present invention.

Scanning probe microscopes usually require vibration isolation and it is common to do this by setting them on a heavy slab mounted on elastic cords or springs. Another approach is to use an air-table. Although the air-table generally functions less well than a slab on springs, it is commonly used because of its ability to keep the microscope at a convenient height for the operator. It is usually necessary to provide some additional isolation to keep out acoustic noise (such as a heavy box placed over the whole system). It is, however, possible to optimize the parameters of slab and spring system so that the displacement caused by putting the microscope on the isolation stage is small and acoustic isolation is straightforward. Such an isolation system is shown in FIG. 17. An acoustic isolation box 300 is used as the support for a vibration isolation system within the box 300. Box 300 is shown with its access door 302 open. The vibration isolation system consists of elastic cords 304, 306, 308 and a forth cord hidden by the wall of the box 300 suspending a massive slab 310. Such suspensions have usually been assembled as large systems (e.g., suspended from a ceiling). However, the only requirement is that the system has a low resonant frequency, typically 1 Hz for longitudinal vibrations. If the slab 310 (plus microscope) extend the elastic cords 304, 306, 308 and the hidden one, by an amount x, then it follows from elementary mechanics that the resonant frequency, f, of the assembly is:

$$f = \frac{1}{2\pi} \sqrt{\frac{g}{x}}$$

where g is the acceleration due to gravity. Thus, a resonant frequency of 1 Hz is obtained for an extension (x) of 25 cm, independent of the size of the isolation system. By using stiff cords 304, 306, 308, etc. and a very massive slab 310, a small system can be built. This approach also has the advantage that the extra movement caused by putting the microscope onto the slab 310 is small (because the fractional added mass is small). So, if the slab is near desk height to begin with, it moves only a little when the microscope is placed onto it. One successful embodiment used four commonly available ¼" diameter bungee cords to hold a 60 pound lead-loaded slab. The height of the whole enclosure is only 3' and it sits conveniently on a desk top. By building the enclosure from a dense material with a well-fitting door, excellent acoustic isolation is also obtained. A microscope operated in this desk-top enclosure gives atomic resolution routinely in high ambient noise environments.

Gas Sparging System

The inventors have discovered that it is often desirable to remove dissolved gasses, particularly oxygen, from solutions used in a scanning probe microscope. This is because the chemical reactivity of oxygen limits the range of electrochemical potential that can be used and limits the nature of the compounds that can be studied in the microscope. A somewhat similar problem arises in liquid chromatography and it has been described in detail by Bakalyar et al. [S. R. Bakalyar, M. P. T. Bradley and R. Honganen, Journal of Chromatography, 158, 277–293 (1978)]. These workers found that sparging (bubbling a gas through) the solution with helium effectively removed all the dissolved oxygen. Helium has a very low solubility in most solvents, so that it not only replaces the undesired gas, but is less likely to form bubbles than other gasses with a higher solubility.

Figure 18:
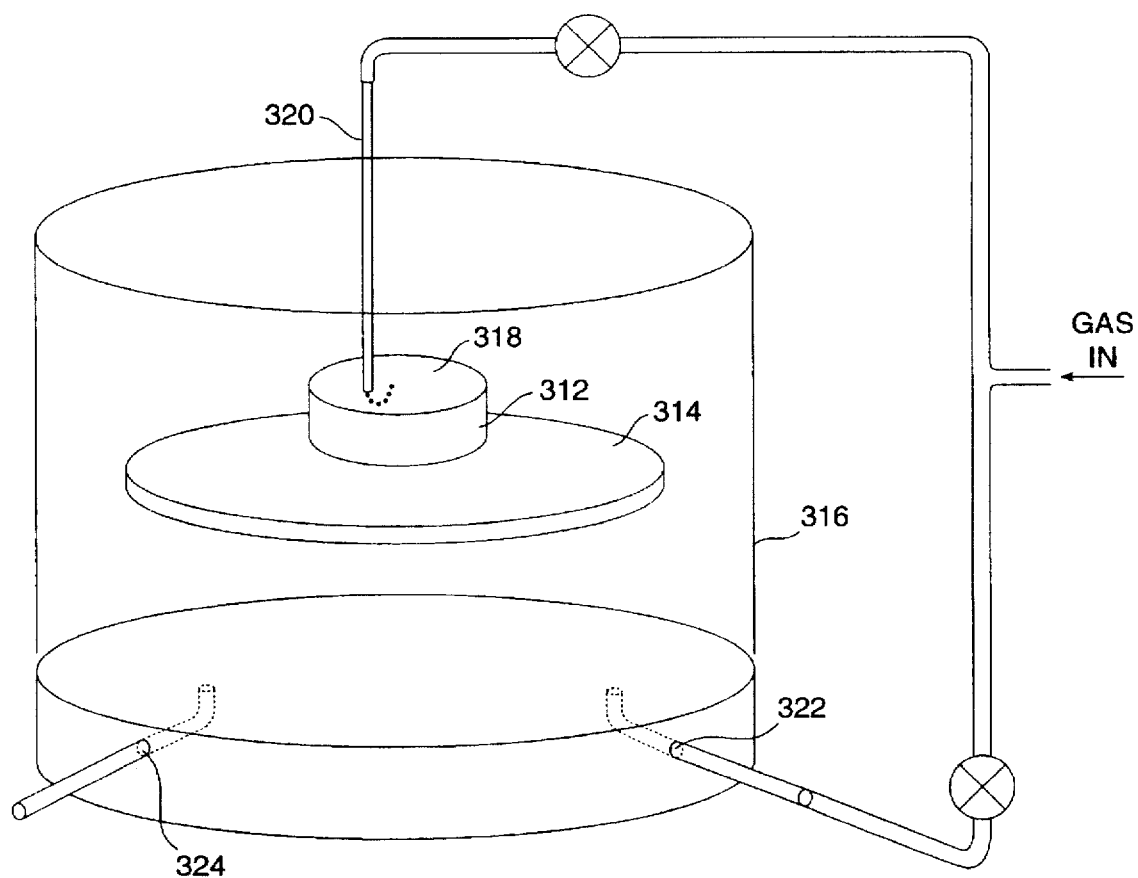
FIG. 18 shows a gas sparging system for a scanning probe microscope according to a presently preferred embodiment of the present invention.

The present design of the microscope lends itself to sparging of the liquid sample by gasses. FIG. 18 shows a presently preferred embodiment of the present invention employing a gas sparging system. The sample cell 312 situated on the sample platen 314 is in place in the hermetically sealed sample chamber 316 of the microscope. Inert gas may be passed directly into the liquid 318 in cell 312 for degassing by sparging using one of the liquid input lines 320 previously described in U.S. patent application Ser. No. 08/388,068, discussed supra. Inert gas is also preferably passed into the body of the chamber 316 via an inlet 322. An outlet 324 permits flow of the gas through the system. The direct sparging of the sample cell 312 is only required in order to accelerate the initial degassing. Degassing will still occur (but more slowly) so long as a flow is maintained through the chamber 316 such as is adequate to prevent the back-diffusion of air into the sample chamber 316. Thus, in operation, gas may be flowed through inlet 322 and outlet 324 initially, and the flow directly into the sample (via line 320) stopped and flow through the chamber maintained. The sample can thus be maintained oxygen free without direct bubbling, avoiding mechanical noise during microscopy.

Nitrogen and argon both work well as sparging gasses, but helium has a particular advantage. Because of its unusual acoustic properties (i.e., its low density and thus, high speed of sound) it provides a poor acoustic impedance match to sound waves that originate in air (which is predominantly nitrogen). Therefore, vibrations of the chamber wall 316 caused by sound are less readily coupled into the chamber if it is filled with helium. Thus, the helium serves a further purpose of providing acoustic isolation, improving the operation of the microscope.

AFM Detector Fine Adjustment

Figure 19:
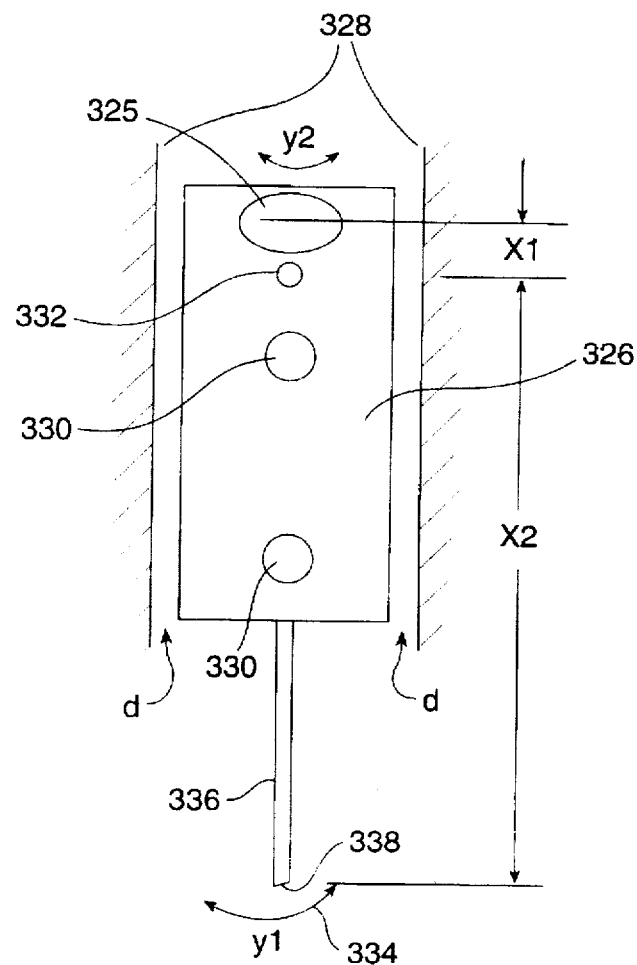
FIG. 19 shows an Atomic Force Microscope detector fine adjustment apparatus according to a presently preferred embodiment of the present invention.
Figure 20:
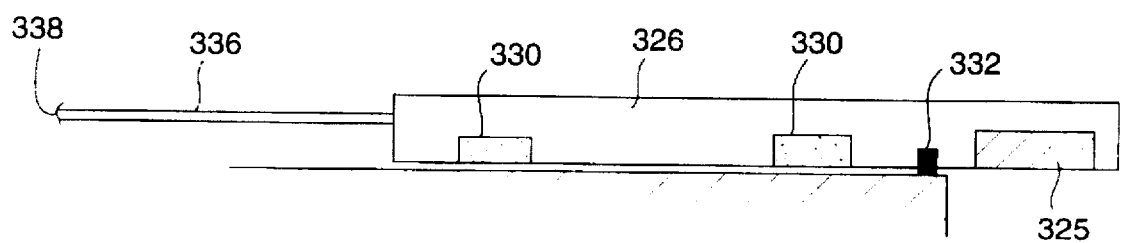
FIG. 20 shows an alternate view of an Atomic Force Microscope detector fine adjustment apparatus according to a presently preferred embodiment of the present invention.

As described in U.S. patent application Ser. No. 08/388, 068, discussed supra, the AFM detector unit is aligned in one direction by sliding it in the slot on the microscope head and in the other (perpendicular) direction by rotating the entire AFM scanning assembly. Another embodiment of the detector unit which permits fine adjustment in this latter direction is shown in FIGS. 19 and 20. This arrangement permits a further (and finer) adjustment beyond that achieved by rotating the scanner head. In this alternative embodiment, the detector housing 326 housing detector 325 is made narrower than the channel 328 that houses it by an amount "d" on each side. Housing 326 is held into channel 328 by means of magnets 330 glued into the detector housing 326 and serving to hold housing 326 in the channel 328 (which is made of a magnetic material). A pin, 332 fixes one point of the housing 326 with respect to the channel 328, so serving to define a rocking motion as indicated by the curved arrow 334 in FIG. 19. The rocking motion is made by means of a handle 336 inserted into the back of the detector housing 326. Lateral motion Y1 of the handle is demagnified in the diminished motion Y2 of the detector. The demagnification ratio is set by the ratio of X1 (the distance between the center of detector 325 and the center of pin 332) to X2 (the distance between the center of pin 332 and the end 338 of handle 336). In this way, fine adjustment of the lateral position of the AFM detector 325 is achieved.

Glove Box Loading System

Figure 21:
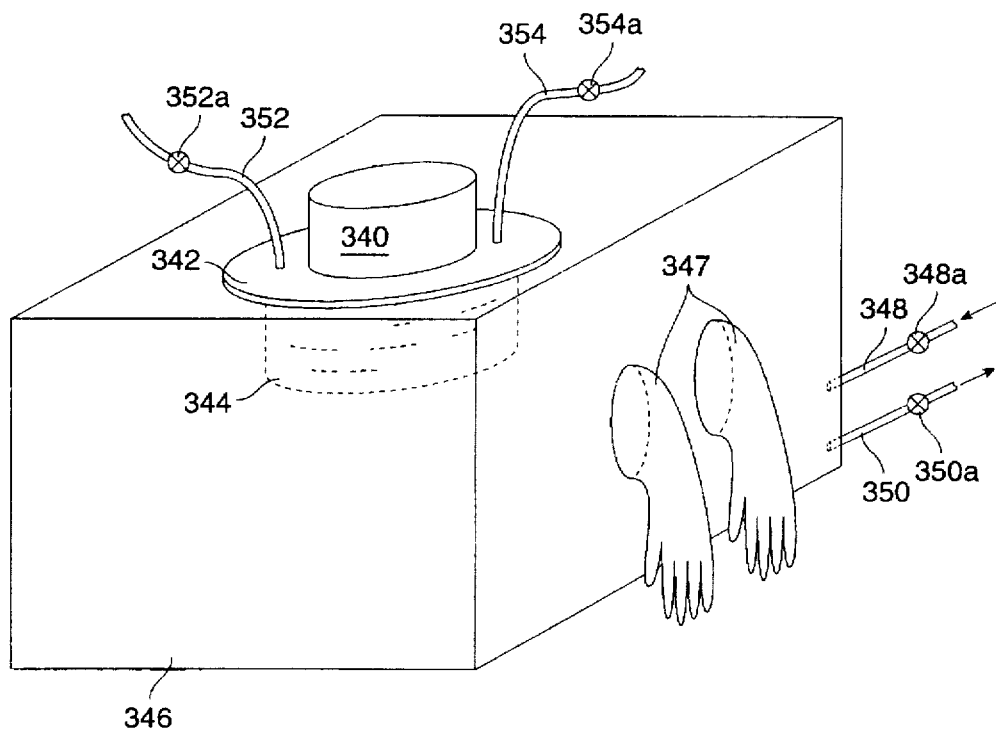
FIG. 21 shows a perspective view of a glove box loading system according to a presently preferred embodiment of the present invention.
Figure 22:
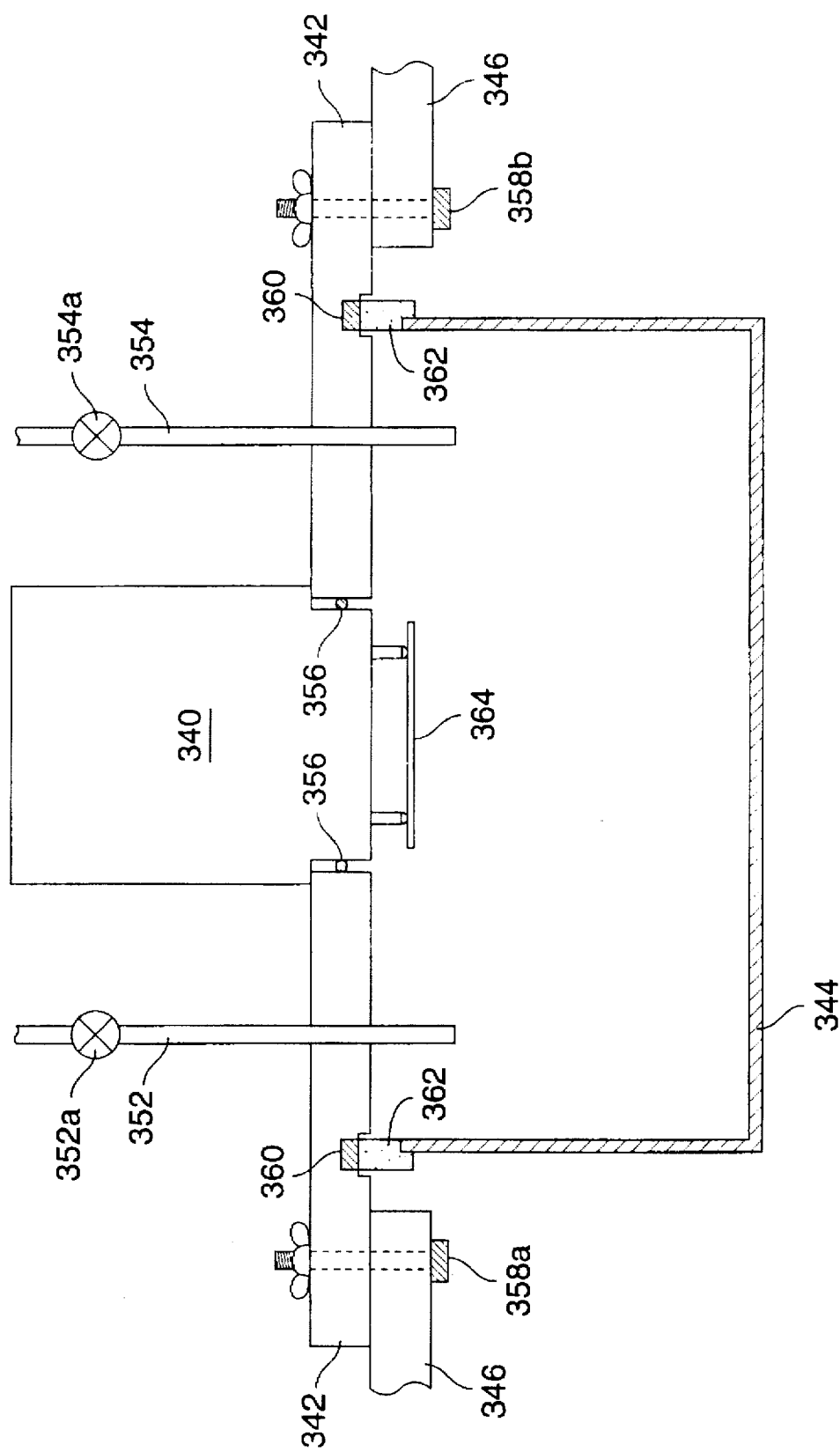
FIG. 22 is a side elevational view of a portion of the glove box loading system according to a presently preferred embodiment of the present invention.

The use of a hermetically-sealed housing for the microscope sample chamber as discussed in U.S. patent application Ser. No. 08/388,068, supra, permits reactive samples to be studied. However, it is often difficult to load such samples into the microscope chamber in the first place. If the entire microscope is placed into a sealed glove box, it may be exposed to reactive chemicals. Furthermore, it would not be possible to start sparging of the microscope sample chamber until after the microscope is passed out of the glove box and gas lines connected to the sample chamber. An adapter which allows easy mating of the microscope with a glove box is shown in FIGS. 21 and 22. Referring to FIG. 21, the microscope 340 seats against a plate 342 to form a hermetic seal. A glass chamber 344 may be attached to the bottom of the plate 342. The plate 342 is bolted onto a glove box 346 comprising a pair of gloves 347 permitting a user outside the glove box loading system to manipulate items inside the glove box loading system without interrupting the hermetic seal provided by the plate 342 which is removable from the scanning probe microscope. Inert gas may be passed through the glove box 346 by means of the gas supply lines 348, 350. A similar pair of gas supply lines 352, 354 permits gas flow through the glass chamber 344 when it is in place. The gas supply lines 348, 350, 352, 354 may be shut off by means of corresponding gas valves 348a, 350a, 352a, 354a when not in use. A detailed section is shown in FIG. 22. The microscope body 340 is pushed into the plate 342 where it is retained by an O-ring 356. The plate 342 seats against the glove box 346, to which it is affixed by bolts 358a, 358b. Magnets 360 pull a magnetic ring 362 up against the plate 342. The glass chamber 344 is affixed to the magnetic ring 362. Thus, the glass chamber 344 may be easily pushed into place and retained by the magnets 360.

The plate 342 is first bolted into place on the glove box 346 and the microscope body 340 inserted into the plate 342. The gas supply lines 352, 354 through plate 342 are sealed with valves 352a and 354a and inert gas flowed through the glove box 346 using the gas supply lines 348 and 350 until the glove box 346 is purged of oxygen and other undesired gasses and vapors. At this point, the sample can be prepared, placed on sample platen 364, and sample platen 364 mounted to the microscope 340 in the inert atmosphere maintained by glove box 346. Once the sample platen 364 is mounted to microscope 340, the glass chamber 344 may then be placed into position on the plate 342 and gas flow started through the gas supply lines 352, 354. The plate 342 may now be unbolted from the glove box 346 with the sample protected inside the glass chamber 344. The microscope, now resting on the glass chamber 344 to which it is sealed, may now be placed into an enclosure for high resolution microscopy. With long gas lines 352, 354 connected to the chamber 344, this enclosure can be situated remotely from the glove box 346 in operation. For low resolution microscopy, when acoustic isolation of the microscope is not so important, the microscope may be operated in-situ in the glove box 346.

Sample Platen with Adjustable Kinematic Mounts

Figure 23:
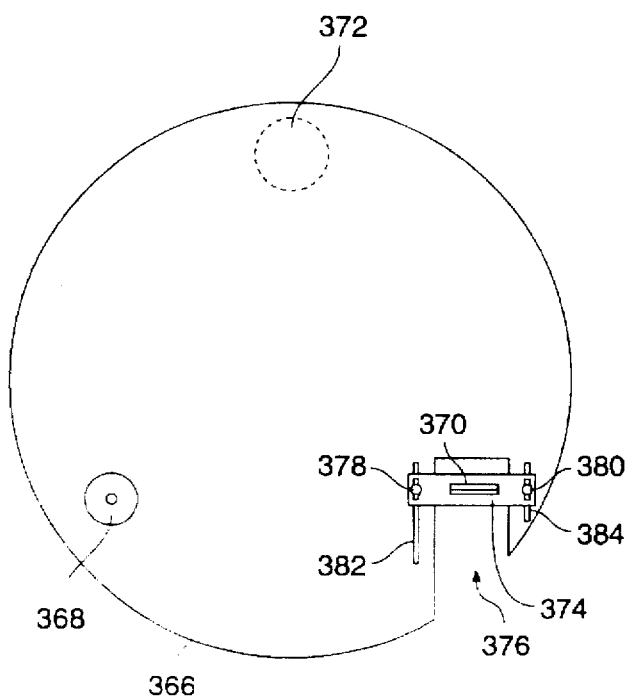
FIG. 23 shows an adjustable sample platen with adjustable kinematic mounts.

The sample platen described in U.S. patent application Ser. No. 08/388,068, supra, is translated by means of adjustment pegs which locate in slots in the sample platen. However, it is sometimes desirable to be able to remove and replace the sample platen while retaining its position with respect to the microscope tip. For example, a very small sample might be used and positioned with the use of an optical microscope. It would be desirable to be able to remove and replace the sample platen with no loss of alignment. FIG. 23 shows an arrangement which permits this. The sample platen 366 mounts onto the magnetic balls disposed at the ends of threaded vertical adjustment rods by means of the cone 368 vee-groove 370 and plane bearings 372 which form a standard kinematic mount, allowing precise removal and replacement of the sample platen 366. In order to allow adjustment of the tip with respect to a sample mounted on this platen 366, the vee groove 370 is made adjustable. It is formed into a piece 374 which slides in a slot 376 in the platen 366. The sliding piece 374 is locked into position by means of two bolts 378, 380 which slide, respectively, in slots 382, 384. In the microscope, the tip is located over the sample in one direction of movement by sliding the vee-groove 370 in its slot 376. It is then locked into place with the bolts 378, 380. The perpendicular adjustment is achieved by rotating the scanner in the body of the microscope.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A scanning probe microscope comprising:

a frame;

a positioning scanner attached to said frame;

a scanning probe coupled to said positioning scanner;

at least three support members engaged with and passing through said frame;

a cover attached to said frame with a hinge;

at least one of said support members engaged with a mechanical actuator disposed on said cover; and a sample stage disposed in a stage plane below said scanning probe, said sample stage is removably attached to said support members;

said mechanical actuator provides a drive in a direction generally orthogonal to said stage plane to said at least one of said support members so as to control a distance between said scanning probe and said sample stage.

2. A scanning probe microscope according to claim 1 wherein said mechanical actuator is a motor and said motor is engaged with said at least one of said support members through a magnetic clutch.

3. A scanning probe microscope according to claim 1 further comprising a chamber removably attached to said frame for surrounding and encapsulating said sample stage.

4. A scanning probe microscope according to claim 3 further comprising a glove box loading system removably attached to said microscope and to surround and hermetically seal a volume containing said chamber, said glove box loading system including:

sealing means for hermetically sealing said glove box loading system to said scanning probe microscope, said sealing means being removable from said scanning probe microscope and glove means permitting a user outside said glove box loading system to manipulate items inside said glove box loading system without interrupting the hermetic seal provided by said sealing means.

5. A scanning probe microscope comprising:

a frame;

a positioning scanner attached to said frame;

a scanning probe coupled to said positioning scanner;

at least three support members engaged with and passing through said frame;

a cover attached to said frame with a hinge;

at least one of said support members engaged with a mechanical actuator disposed on said cover; and said support members rest on a surface to be scanned, said surface being generally in the shape of a plane;

said mechanical actuator provides a drive in a direction generally orthogonal to said surface to said at least one of said support members so as to control a distance between said scanning probe and said surface.

6. A scanning probe microscope according to claim 5 wherein said mechanical actuator is a motor and said motor is engaged with said at least one of said support members through a magnetic clutch.

7. A scanning probe microscope comprising:

a frame;

a positioning scanner attached to said frame;

a scanning probe coupled to said positioning scanner;

at least three support members, each having first and second ends, each engaged with and passing through said frame and including magnetic portions at its second end;

a sample stage fabricated of a material attracted to said magnetic portions, said sample stage disposed in a stage plane below said scanning probe, said sample stage is removably attached to said support members;

a cover attached to said frame with a hinge;

at least one of said support members engaged with a mechanical actuator disposed on said cover; and said mechanical actuator provides a drive in a direction generally orthogonal to said stage plane to said at least one of said support members so as to control a distance between said scanning probe and said sample stage.

8. A scanning probe microscope according to claim 6 wherein said mechanical actuator is a motor and said motor is engaged with said at least one of said support members through a magnetic clutch.

9. A scanning probe microscope according to claim 8 further comprising a chamber removably attached to said frame for surrounding and encapsulating said sample stage.

10. A scanning probe microscope according to claim 9 further comprising a glove box loading system be removably attached to said microscope and to surround and hermetically seal a volume containing said chamber, said glove box loading system including:

sealing means for hermetically sealing said glove box loading system to said scanning probe microscope, said sealing means being removable from said scanning probe microscope and glove means permitting a user outside said glove box loading system to manipulate items inside said glove box loading system without interrupting the hermetic seal provided by said sealing means.

* * * * *